United States Patent
Ryder

(10) Patent No.: US 7,421,408 B2
(45) Date of Patent: Sep. 2, 2008

(54) PERSONAL OR FAMILY FINANCIAL ACCOUNTING AND MANAGEMENT SYSTEM

(76) Inventor: Lee Ryder, 4221 Wayner Dr., Memphis, TN (US) 38117

( * ) Notice: Subject to any disclaimer, the term of this patent is extended or adjusted under 35 U.S.C. 154(b) by 1137 days.

(21) Appl. No.: 10/112,825

(22) Filed: Mar. 29, 2002

(65) Prior Publication Data

US 2002/0156710 A1 Oct. 24, 2002

Related U.S. Application Data

(60) Provisional application No. 60/282,064, filed on Apr. 5, 2001.

(51) Int. Cl.
*G06Q 40/00* (2006.01)
(52) U.S. Cl. ............... 705/36 R; 705/35; 705/36 T; 705/30
(58) Field of Classification Search .......... 705/36 R, 705/35–45, 400, 30–34, 404; 707/100–104
See application file for complete search history.

(56) References Cited

U.S. PATENT DOCUMENTS

| 5,991,744 A * | 11/1999 | DiCresce ............... 705/36 R |
| 7,050,997 B1 * | 5/2006 | Wood, Jr. ............... 705/36 R |
| 2002/0103733 A1 | 8/2002 | Barrington |

OTHER PUBLICATIONS

Heckerman, Donald A. "Financial Modeling: A Powerful Tool for Planning and Decision Support" Managerial Planning, v30n5, pp. 21-25, Mar./Apr. 1982.*

PCT Search Report by U.S. Patent and Trademark Office, mailed Dec. 11, 2002—7 pages.
http://www.adviceamerica.com/aasite/newlook/index.asp; Jun. 27, 2002, one page.
http://www.adviceamerica.com/aasite/LifeVision/Slideshow/Pages/Page1.asp; Jun. 27, 2002; one page.
http://www.adviceamerica.com/aasite/LifeVision/Slideshow/Pages/Page2.asp; Jun. 27, 2002; one page.
http://www.adviceamerica.com/aasite/LifeVision/Slideshow/Pages/Page3.asp; Jun. 27, 2002; one page.
http://www.adviceamerica.com/aasite/LifeVision/Slideshow/Pages/Page4.asp; Jun. 27, 2002; one page.
http://www.adviceamerica.com/aasite/LifeVision/Slideshow/Pages/Page5.asp; Jun. 27, 2002; one page.
http://www.adviceamerica.com/aasite/LifeVision/Slideshow/Pages/Page6.asp; Jun. 27, 2002; one page.
http://www.adviceamerica.com/aasite/LifeVision/Slideshow/Pages/Page7.asp; Jun. 27, 2002; one page.

(Continued)

*Primary Examiner*—Mary Cheung
*Assistant Examiner*—Kirsten Apple

(57) ABSTRACT

The invention is directed to a personal financial management system and method for personal financial management. A user interface attached to a computer may interact with the user and/or financial institutions to acquire information regarding fiscal behavior and asset allocations and performance. These may be compared with budgetary guidelines. The budgetary guidelines may be determined from a personal finance code. The personal finance code may be a set of desired source and use of funds allocations, asset allocations, and future fiscal events. A comparison of the budgetary guidelines and the fiscal behavior may be projected and compared to the personal finance code to determine a state of personal finances.

24 Claims, 15 Drawing Sheets

OTHER PUBLICATIONS http://www.adviceamerica.com/aasite/LifeVision/Slideshow/Pages/Page8.asp; Jun. 27, 2002; one page.

http://www.adviceamerica.com/aasite/LifeVision/Slideshow/Pages/Page9.asp; Jun. 27, 2002; one page.

* cited by examiner

| ASSET CLASS AS % TOTAL ASSETS + L | 12/31/93 | 12/31/94 | 12/31/95 | 12/31/96 | 12/31/97 | 12/31/98 | 6/30/99 | 12/31/99 | 4/30/00 | 12/31/00 |
|---|---|---|---|---|---|---|---|---|---|---|
| IPA | 83.33% | 65.44% | 67.78% | 68.81% | 97.46% | 83.03% | 83.50% | 82.00% | 81.05% | 82.00% |
| NPIPA | 3.83% | 3.47% | 2.48% | 2.46% | 0.54% | 0.03% | 0.00% | 0.00% | 0.00% | 0.00% |
| ICA+L | 9.68% | 28.13% | 26.80% | 25.78% | 0.84% | 12.65% | 12.50% | 13.75% | 14.00% | 13.50% |
| NA | 3.15% | 3.04% | 2.94% | 2.92% | 1.16% | 4.28% | 4.00% | 4.25% | 4.95% | 4.50% |

| L | 0.00% | 6.81% | 6.31% | 5.57% | 0.00% | 0.00% | 0.00% | 0.50% | 0.50% | 0.00% |
|---|---|---|---|---|---|---|---|---|---|---|

*FIG. 8*

DATA STRUCTURE
| ACTUAL | |
|---|---|
| EXPECTED | |
| CUMULATIVE ACTUAL | |
| CUMULATIVE EXPECTED | |
| CUMULATIVE BALANCE | |
FIG. 12
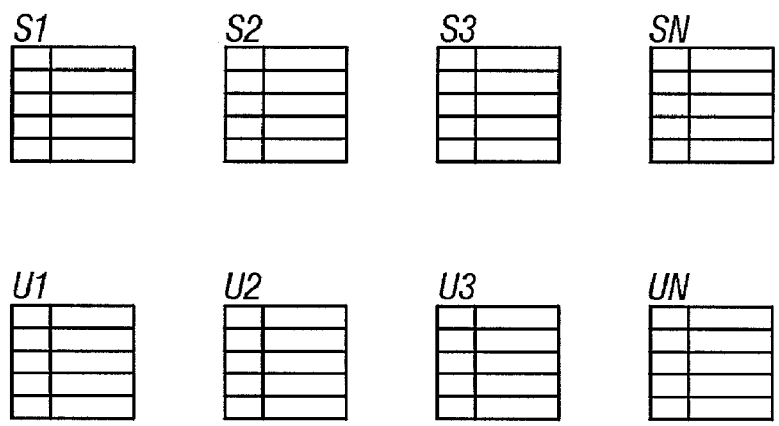
FIG. 13
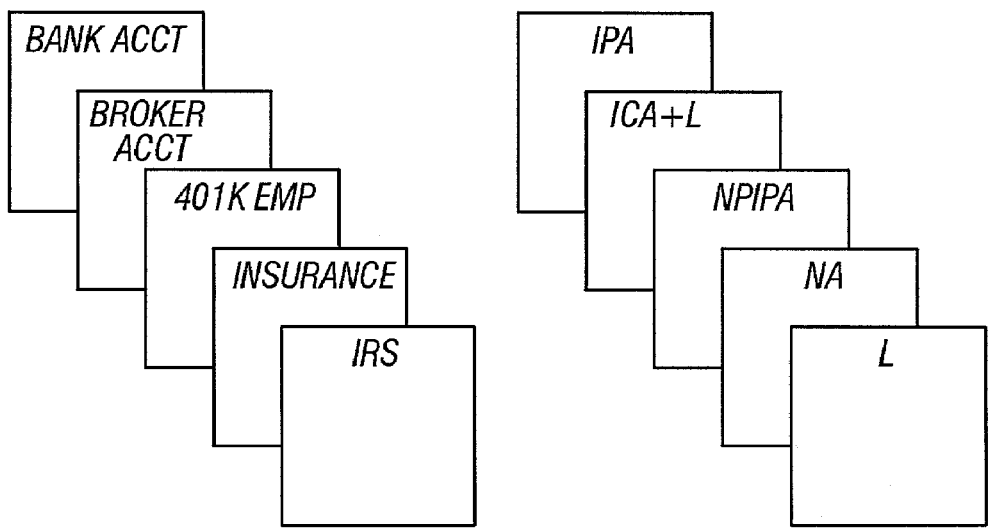
FIG. 14

|  | ANNUAL | MONTHLY |
|---|---|---|
| SALARY | | |
| SOURCE-N | | |
| NEW DEBT | | |
| RETIREMENT | | |
| SALE ASSET | | |
| INVESTMENT REFERENCE | | |
| TOTAL | | |
| CASH | | |

|  | ANNUAL | MONTHLY |
|---|---|---|
| U1 | | |
| U2 | | |
| UN | | |
| TAXES | | |
| RETIREMENT | | |
| MTG INTEREST | | |
| DEBT REPAYMENT | | |
| PURCHASE ASSET | | |

FIG. 21

| ASSET TYPE | VALUE | RATE |
|---|---|---|
| A-1 | | |
| A-2 | | |
| A-3 | | |
| A-4 | | |
| A-N | | |
| TOTAL | | |

FIG. 22

| | PERIOD 1 | PERIOD 2 | PERIOD 3 | PERIOD N |
|---|---|---|---|---|
| ESTIMATE | | | | |
| ACTUAL | | | | |
| CUM. ESTIMATE | | | | |
| CUM. ACTUAL | | | | |
| BALANCE | | | | |

FIG. 23

PERSONAL OR FAMILY FINANCIAL ACCOUNTING AND MANAGEMENT SYSTEM

RELATED APPLICATIONS

This application claims priority of U.S. Provisional Application, Ser. No. 60/282,064, filed Apr. 5, 2001 entitled: "Method and System for Establishing and Complying with a Personal Financial Code", and is incorporated herein by reference in its entirety.

BACKGROUND OF THE INVENTION

1. Field of the Invention

The present invention generally relates to a personal financial management system. In particular, the present invention relates to method and system for determining the state of an individuals finances, establishing a personal financial code and projecting the effect of fiscal decisions and behaviors.

2. Description of Prior Art

Business uses profit as a quantified unit of measure. With this quantified unit of measure, business financial management system may determine the state of the company as it has performed over the previous time period and/or project how the business will perform over future time periods. For example, a business may provide monthly, quarterly, and/or annual reports. Further, the business may predict monthly, quarterly, or annual profits for one or more future periods.

Profit may be used in fundamental analysis to aid in determining the value of a company. For example, a stock purchaser may use profit to price ratios in a decision to purchase stock. In addition, a stock purchaser may use projected profits in the decision. In another example, a real estate investor may use a multiple of profit in determining a value of a rental property.

Projected profits may also be used in making decisions. For example, a company may weigh the decision of buying new equipment, which would reduce the cost of a product. In weighing the decision, the company may use projected profits over one or more periods.

As such, business has a universal measure of fiscal state—profit. With this universal measure, business developed elaborate management systems. Business models, accounting systems, reports, and financial statements are all built on the universal business measure—profit. Further, profit is a quantified unit of measure. With a unit of measure, it is possible to link one activity of a business with every other activity of a business. As such, businesses may determine the consequence of fiscal decisions.

Accounting and budgetary principles are typically used in determining the state of a business. Many typical personal accounting systems have attempted to apply these principles to individuals. However, personal financial measures differ from business measures in various manners. For example, individuals may not measure a financial state in terms of profit. Further, individuals have a limited lifetime and thus a lifetime-limited pool of funds.

Many typical budgetary systems for individuals attempt to apply business measures to individuals. However, the individual is not a business. Individuals do not have a profit motive. Individuals are motivated by lifestyle and projected financial goals, or a vision of financial well being. Consequently, management systems constructed by business around the profit measure do not work for the individual.

Many typical systems substitute return on investment for profit. However, return on investment is the performance of an asset and profit is income minus expenses. Moreover, return on investment only applies to assets and, as such, is only one aspect of personal finance. Therefore, return on investment is a poor unit of measure. Further, profit is a business formula that does not apply to the individual.

Many financial concepts such as risk management; debt management, tax management, savings, asset allocation, and financial plans are of little management value without a personal financial measure. For example, savings for business is a reduction in costs or expenses that may result in increased profit. A car rental company might buy rental cars cheaper from one manufacturer than another. The resulting saving may increase profits. However, an individual might purchase a less expensive new car from one manufacturer rather than another. The individual may have a larger checkbook balance. However, an increase in checkbook balance is not savings for an individual.

Actually, savings for the individual is an increased in an income producing asset or a reduction in liability. For example, purchasing stock may be an increase in a income producing assets. This is savings. The possible return on that investment next year and the years following may further increase the value of the individuals income producing assets. This is also savings. In further contrast with the business model, savings for the individual had a cost. The cost may have been in immediate lifestyle purchases, payment of other expenses, or other fiscal events. Further, this cost effects other fiscal decisions.

Debt is another example of business principles and practices incorrectly applied to the individual. The use of debt by business has a clear understandable effect on the profit measure. A business may use debt to purchase a machine to produce a product to generate a profit. In theory, a business borrows money to increase profits.

Individuals generally do not borrow money to make more money. Rather, individuals borrow money to consume or purchase income-consuming assets. Using debt to purchase a machine may directly affect the profit of the company. However, the use of debt by an individual does not have a clear and understandable effect on the individual's financial well-being. The accumulation of debt is often a disaster for individuals or families.

Another difference between business financial principles and those of personal finance is the difference in lifetime. Businesses may operate indefinitely. Principles established to manage fiscal policy are created for the infinite time period. Individuals have a limited lifetime and a limited pool of income from which to draw.

Various budgetary software programs exist. However, these programs do not provide a measure of personal financial well-being. Further, these programs fail to project the effect of budgetary discrepancies.

As such, many personal budgetary management systems suffer from deficiencies in providing a measurement of personal finances, establishing a personal financial code, and projecting the effect of fiscal decisions and behaviors. Many other problems and disadvantages of the prior art will become apparent to one skilled in the art after comparing such prior art with the present invention as described herein.

SUMMARY OF THE INVENTION

Aspects of the invention are found in a personal financial management system and a method for determining the state of a person's finances. In the method, a personal finance code may be established. The personal finance code is a means for setting fiscal goals. These goals may include future events for which a specific monetary amount is desired. Alternatively, these goals may be an allocation of assets among various asset classifications. Further, these goals may include both future events and source, use, and asset allocations rules, among others.

Other aspects of the invention may be found in determining one or more budgetary guidelines associated with the personal finance code. These budgetary guidelines may be further associated with spending categories, saving and income requirements, among others. In addition, these budgetary guidelines may be associated with a time period or cumulatively tracked balance. Further, these budgetary guidelines may be compared with actual fiscal behavior. This behavior may include actual spending, income, and savings. Similarly, this fiscal behavior may be associated with a time period.

Additionally, the comparison of the budgetary guidelines and the fiscal behavior may be used to determine a state of personal finance relative to the personal finance code. This determination may include, for example, comparing the consequence of the fiscal behavior to the desired asset allocation. Alternately, the determination may include, for example, projecting the consequences of the fiscal behavior for comparison with the desired monetary requirements of future events. One form of this projection may be to multiply differences between the fiscal behavior and the budgetary guidelines by a number of time periods. Alternately, the projection may be to sum the differences over a time to determine a cumulative effect.

In addition, the budgetary guidelines and fiscal behaviors may be categorized. These categories may include income, lifestyle, taxes, gifts, vacations, interest, food, clothing, insurance, automobile, home, utilities, recreation, children, spending, asset purchase, and other sources and uses of funds that are applicable. Further, the personal finance code may include rules associated with asset allocations. These allocations may be categorized as income producing assets, income consuming assets, non-performing income producing assets, and neutral assets, among others.

Additional aspects of the invention may be found in a system for performing the method. The system may have a computational circuitry and a user interface. The computational circuitry may be a laptop, PDA, desktop, or personal computer. Alternately, the computational circuitry may be a server connected to an interconnected network. Further, the computation circuitry may take the form of other computational devices such as handheld circuitry, smart devices, and others.

The user interface may have visual and data entry elements. For example, the user interface may be a monitor, keyboard, and mouse with software designed for interaction with these devices. In addition, the user interface may include a web browser.

In addition, aspects of the invention may be found in the functionality of the computational device. The computational device may interact with the user and/or other remote data sources to acquire information associated with the personal financial code and/or fiscal behaviors. For example, a desktop computer may retrieve a bank account registry or a brokerage statement. Alternately, a server may interact with servers, computers, and terminals of various institutions, among others, to acquire information associated with fiscal behaviors and assets.

Further aspects of the invention may be found in a software code for performing the method. Additional aspects of the invention may be found in a computer readable medium on which the software code may be stored.

As such, a system for managing personal finances is described. Other aspects, advantages and novel features of the present invention will become apparent from the detailed description of the invention when considered in conjunction with the accompanying drawings.

BRIEF DESCRIPTION OF THE DRAWINGS

FIG. 8 is a tabular graphic depicting an exemplary embodiment of a periodic assessment and reallocation of assets, according to FIG. 7.

FIG. 12 is a block diagram depicting an exemplary embodiment of a data structure for use by the invention, as seen in FIGS. 10 and 11.

FIG. 13 is a block diagram depicting an exemplary embodiment of a set of data structures for use by the invention, as seen in FIGS. 10 and 11.

FIG. 14 is a block diagram depicting a further exemplary embodiment of a set of data structures for use by the invention, as seen in FIGS. 10 and 11.

FIG. 21 is a block diagram of an exemplary embodiment of an entry table for an exemplary embodiment of the system as seen in FIG. 15.

FIG. 22 is a block diagram of an exemplary embodiment of an entry table for an exemplary embodiment of the system as seen in FIG. 15.

FIG. 23 is a block diagram of an exemplary embodiment of a table for an exemplary embodiment of the system as seen in FIG. 15.

DETAILED DESCRIPTION OF THE PREFERRED EMBODIMENT

Figure 1:
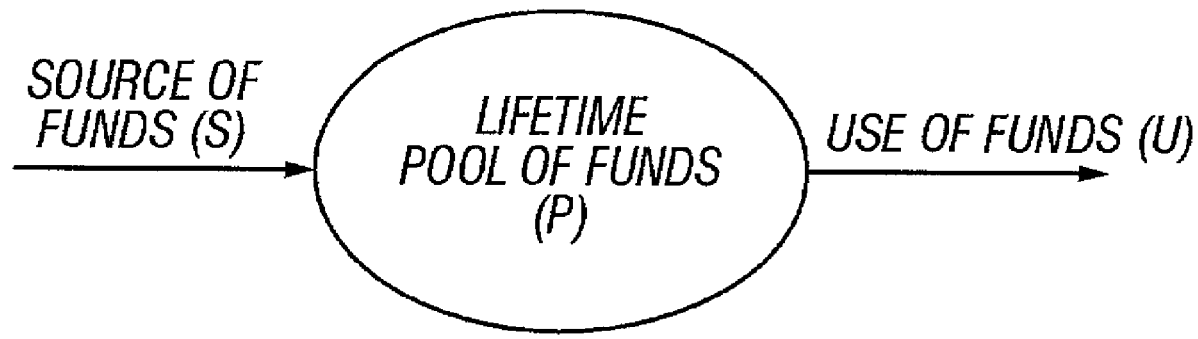
FIG. 1 is a block flow diagram depicting the flow of funds of an individual, according to the invention.

Business uses profit as a quantified unit of measure. With this quantified unit of measure, business financial management system may determine the state of the company as it has performed over the previous time period and/or project how the business will perform over future time periods. For example, a business may provide monthly, quarterly, and/or annual reports. Further, the business may predict monthly, quarterly, or annual profits for one or more future periods.

Profit may be used in fundamental analysis to aid in determining the value of a company. For example, a stock purchaser may use profit to price ratios in a decision to purchase stock. In addition, a stock purchaser may use projected profits in the decision. In another example, a real estate investor may use a multiple of profit in determining a value of a rental property.

Projected profits may also be used in making decisions. For example, a company may weigh the decision of buying new equipment which would reduce the cost of a product. In weighing the decision, the company may use projected profits over one or more periods.

However, unlike business, personal financial management does not have a profit equivalent. In addition, other differences exist between personal finance and business.

Time—Business by definition does not have a finite operating time frame. Consequently, business has developed periodic time frames such as months, quarters, or years. Individuals have a finite time period, which is a lifetime. In terms of years or months, it is not known how long this time period is, but it is known that the lifetime is finite. The fact of finite lifetime may enable the performance algebraic calculations.

Revenue—Because time is not finite, revenue is not finite for business. Revenue just keeps adding up for as long as the business continues. Individuals on the other hand have a finite amount of money that accrues to them over a lifetime. The exact amount is not known, but it is known that the amount is finite. Again, this may provide the ability to perform algebraic calculations.

As such, a personal financial accounting and management system and method is described herein to aid persons in determining a state of personal finance. Further, a method is described for determining the effect of personal fiscal decisions and behaviors on future financial state. The method may be implemented as software. Also, an apparatus is described for implementing the system and method on a stand alone computer and/or server connected to an interconnected network.

Personal financial management differs from business financial management. Personal financial management involves controlling and directing personal resources and use of funds to realize quantified present and future financial expectations. Further, personal financial management involves maintaining established measures of personal finance performance and a desired asset mix.

As such, a personal financial management system establishes a set of principles, rules, plans and constraints, among others. These principles, rules and constraints may be classified. In addition, these principles, rules, and constraints are linked.

The principles, rules, plans, and guidelines may form a personal finance code. This personal finance code may, for example, be an anticipated event that may have an influence on a personal fiscal state. Further, the personal finance code may be a present or future allocation of assets. In addition, the personal finance code may be a present or future allocation of sources and uses of funds. Furthermore, the personal finance code may be a combination of instances of any and/or all of these definitions, among others. The personal financial code may be unique to each individual because each individual's source of funds, use of funds, goals, and concepts of financial well being are different.

For example, the personal finance code may be a present plan for use of funds in addition to a fiscal plan for retirement and the anticipation of supporting a child through college. In another embodiment, the personal finance code may be an asset allocation for a retiree in addition to a present plan encompassing receiving social security benefits and a use of funds allocations.

FIG. 1 is a block flow diagram depicting the flow of funds of an individual, according to the invention. This diagram may represent a person's lifetime, for example. Within a lifetime, an individual will acquire a finite amount of money (source of funds). That amount accumulates into the lifetime pool of funds (also a finite amount). The lifetime pool of funds is decreased by the individual's use of funds over his/her lifetime (also finite). For a person, the pool of funds is limited by lifetime and income potential. The fact that the totaled funds that accrue to an individual over a lifetime is finite may be used to the develop a personal financial accounting and management system. However, the diagram may represent the source, use, and pool of funds over another finite period. Similarly, this other finite period may be used to develop the personal financial management system.

The source of finds (S) may be income, investment returns, trust fund benefits, gifts received, Social Security, gambling winnings and, inheritance, among other forms of monetary influx. The use of finds (U) may be expenses, asset purchases, and other outward fluxes of funds.

Figure 2:
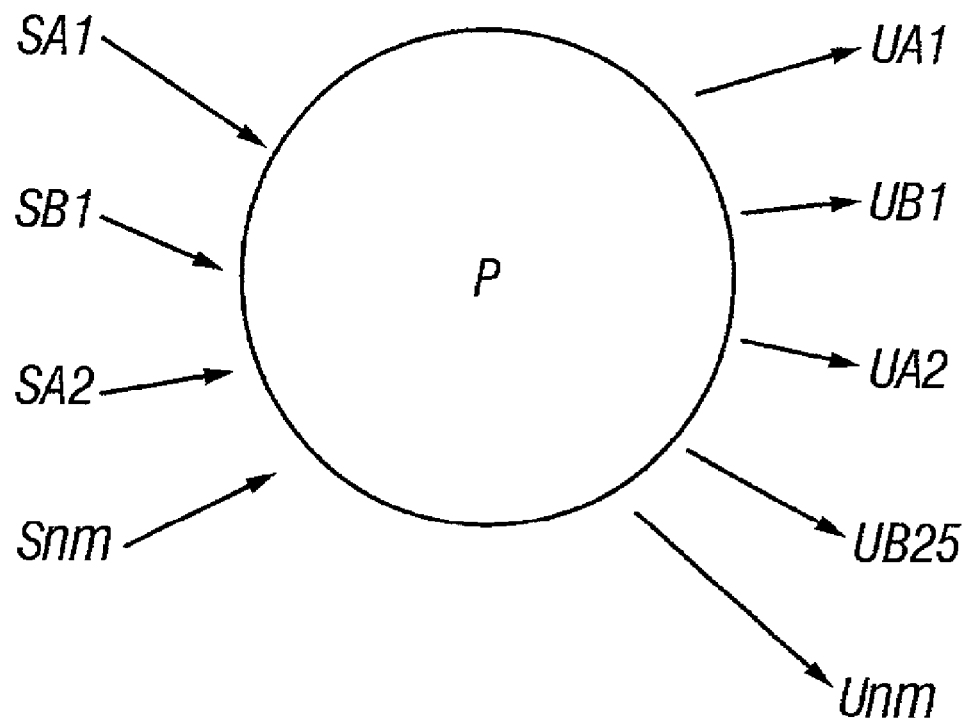
FIG. 2 is a further block flow diagram depicting the flow of funds of an individual from multiple sources of income to multiple uses, according to the invention.

FIG. 2 is a further block flow diagram depicting the flow of funds of an individual from multiple sources of income to multiple uses, according to the invention. Similar to FIG. 1, FIG. 2 depicts multiple sources of funds flowing into a pool of funds (P) and multiple uses of finds flowing from the pool of funds (P).

In FIG. 2, multiple sources are shown. These may be more than one source of funds for a given period (SA1 and SB1). These may be the same source across multiple periods (SA1 and SA2). Further, these may be any source for any period (SNM).

The period may take many forms. These forms may include, for example, hourly, daily, weekly, monthly, annual, biannual, and other periods.

Similarly, the use of funds may be several uses for a given period (UA1, UB1), the same use over more than one period (UA1, UA2) (UB1, UB25), or any use in any period. These periods may be any period, as described above.

As the pool of funds may be limited, each use and each source are linked. Excesses in one use may affect the available funds for another use. Further, a change in the source or amount of income may alter the funds available for each use.

For example, an increase in a source of income in a present period may enable use of those funds in any future period. A decrease in a present use may increase funds available for any period in the future. Allocating use of funds for a future use may show the amount of income needed now to satisfy the future requirements. In addition, a change in present source may alter a future source. This future source may be retirement income and any other desired future source of funds.

In the short-term, use of funds can be easily matched with a source of funds. For example, going out to dinner this week may be paid for by the money coming from this week's paycheck. In a lifetime, use of funds may be taken from a pool created from all sources of funds. Sources of funds, use of funds and time frame are all finite and measurable. Actions to the pool of funds today affect the amount of funds available in the future. For example, spending $5,000 on a vacation this year is measured by how it affects your retirement income 20 years from now.

If the $5,000 is expected to grow at 8% compounded annual growth, it will turn into $20,000, 20 years from now. If retirement savings is expected to yield 10%, $20,000 will yield $2,000 in annual income. The decision to spend $5,000 on vacation this year is a decision to have $2,000 less income a year at retirement.

Figure 3:
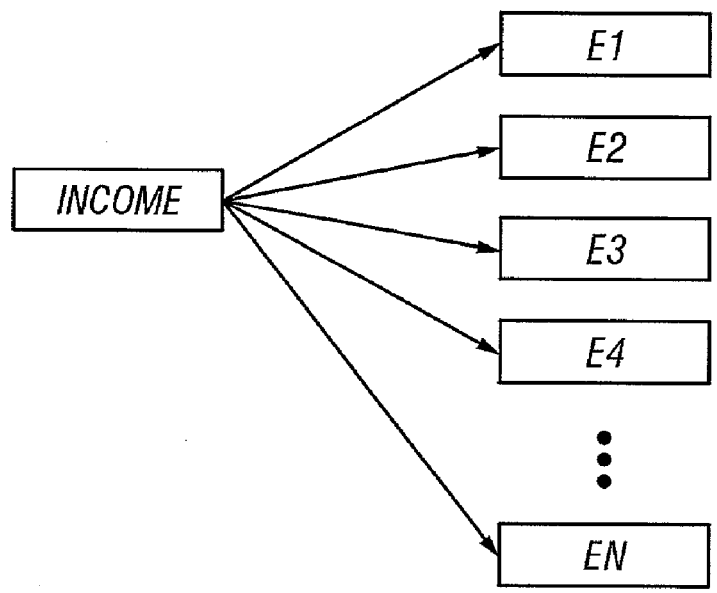
FIG. 3 is another block flow diagram depicting the distribution of income, according the invention.

FIG. 3 is another block flow diagram depicting the distribution of income. Income may be allocated to various uses. These uses may include, for example any combination of spending, savings, debt reduction, gifting, or asset purchasing, and others.

The income allocation may be altered for future or subsequent periods. In addition, the income allocation may differ from an expected or budgeted income allocations. For example, a housing expense may exceed expectations. Further, an unexpected expense, such as a car repair, may occur.

Figure 4:
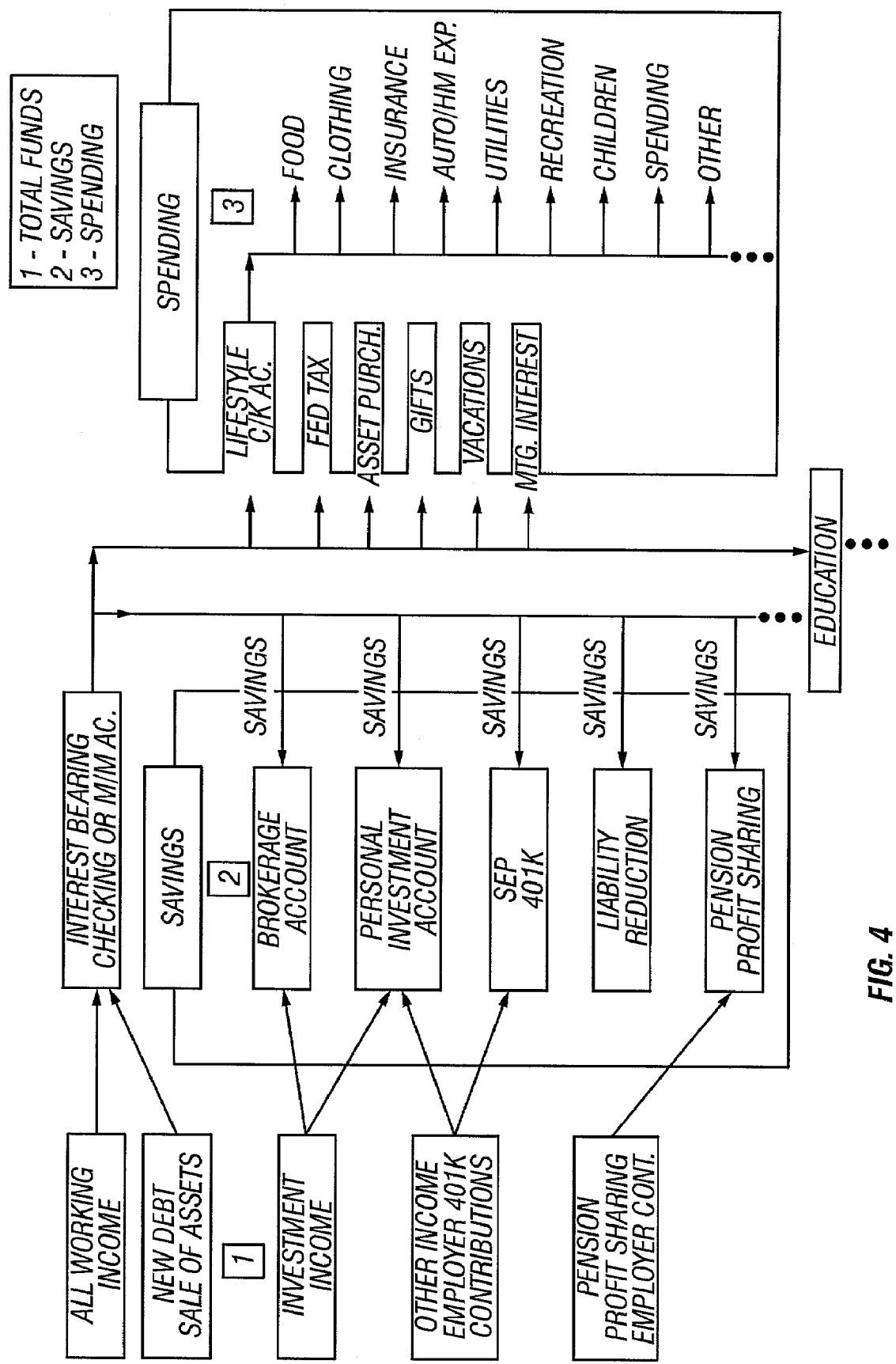
FIG. 4 is a further block flow diagram depicting one exemplary embodiment of the flow of funds, according to FIG. 1.

FIG. 4 is a further block flow diagram depicting one exemplary embodiment of the flow of funds, according to FIG. 1. In this exemplary embodiment, income is allocated to savings and spending, among others.

As seen in FIG. 4, income may take various forms. Income may include salary, commission, wage, or other income. Further, income may include investment income, employer contributions to retirement investments, gifts received, Social Security, profit sharing and other income.

Spending may take various forms. These forms may include lifestyle expenses, federal, state and local taxes, asset purchasing, gifting, vacations, mortgage and other debt interest, education, debt principle reduction and other expenses. Further, lifestyle expenses may include food, clothing, insurance, automobile, housing, utility, recreation, child-related, miscellaneous, and other expenses. Educational expenses may be considered different from other spending as it may feedback into non-passive income. Further, asset purchases may feedback into investment income.

Savings is the purchase of assets and/or reduction in liability, among others. In addition, savings may take various forms. These forms may include buying assets in a brokerage account, personal investment account, or retirement account, among others. These forms may also include pension shares, real estate, liability reduction, principle in home or other asset, and others.

Assets may be categorized by various means. Such means may include the categories of income producing assets (IPA), income consuming assets and liabilities (ICA &L), non-performing income producing assets (NPIPA), and neutral assets (NA), among others.

Income producing assets (IPA) are any assets that produce income. IPA may take the form of savings accounts, equities, bonds, and real estate investments, among others. Further, IPAs may be assets that produce income, are liquid and/or have a market value.

Income consuming assets (IC) are assets requiring continuous funding to support their existence. For example, an IC may be a house with a mortgage. Other forms include cars, airplanes, and vacation homes, among others, that require debt payment and/or maintenance.

Neutral assets (NA) are assets that do not produce or consume income. These may include artwork and/or furniture, among others.

Non-performing income producing assets (NPIPA) may be assets that require an event to produce income. For example, a residence may be a house with a mortgage. The value of the house may, for example, be $250,000. Of the $250,000, for example, $200,000, may be owed in a mortgage. The $200,000 is a IC. The remaining $50,000 may be a NPIPA. The house may be sold to realize the income. In another example, the NPIPA may be raw land. Further, NPIPA may not produce income, be liquid, and/or have a market value.

IPAs and, within some future period, NPIPAs may feedback and add to the income. ICA & Ls may add to expenses. NAs have little effect on money flow, except perhaps as an expense in one period.

The purchase of assets and allocation of income to expenses and savings represents the activities associated with a fiscal state. However, this fiscal state must be measured against some standard. People vary considerably in income, desired lifestyle, fiscal habits and behaviors, and fiscal needs. To establish a standard relative to which an individual may measure a personal fiscal state or performance, a personal financial code may be established.

The personal financial code may be derived from future fiscal events anticipated by the individual or from a desired asset allocation. For example, an individual may have children who may have college expenses 10 to 15 years in the future. This individual may estimate the monetary and asset requirement necessary to pay for the anticipated expense of college. In another example, an individual may anticipate retiring. The individual may anticipate a quantified monetary need to maintain a lifestyle after retirement. Further, an individual anticipating retirement or a retired person may desire a specific asset allocation. For example, a retired person may desire an asset allocation that includes a heavy weighting in income producing assets. However, a person anticipating retirement many years away may prefer to have NPIPAs.

As such, these anticipated expenses, lifestyle requirements and asset allocation preferences represent a personal financial code. This code may be used to determine budgetary guidelines as each of the elements of a personal financial code are connected. Specifically, some lifestyle desires may conflict with anticipated expenses or asset allocation preferences. For example, a new luxury car may conflict with saving for a child's education and avoidance of ICA & Ls.

Figure 5:
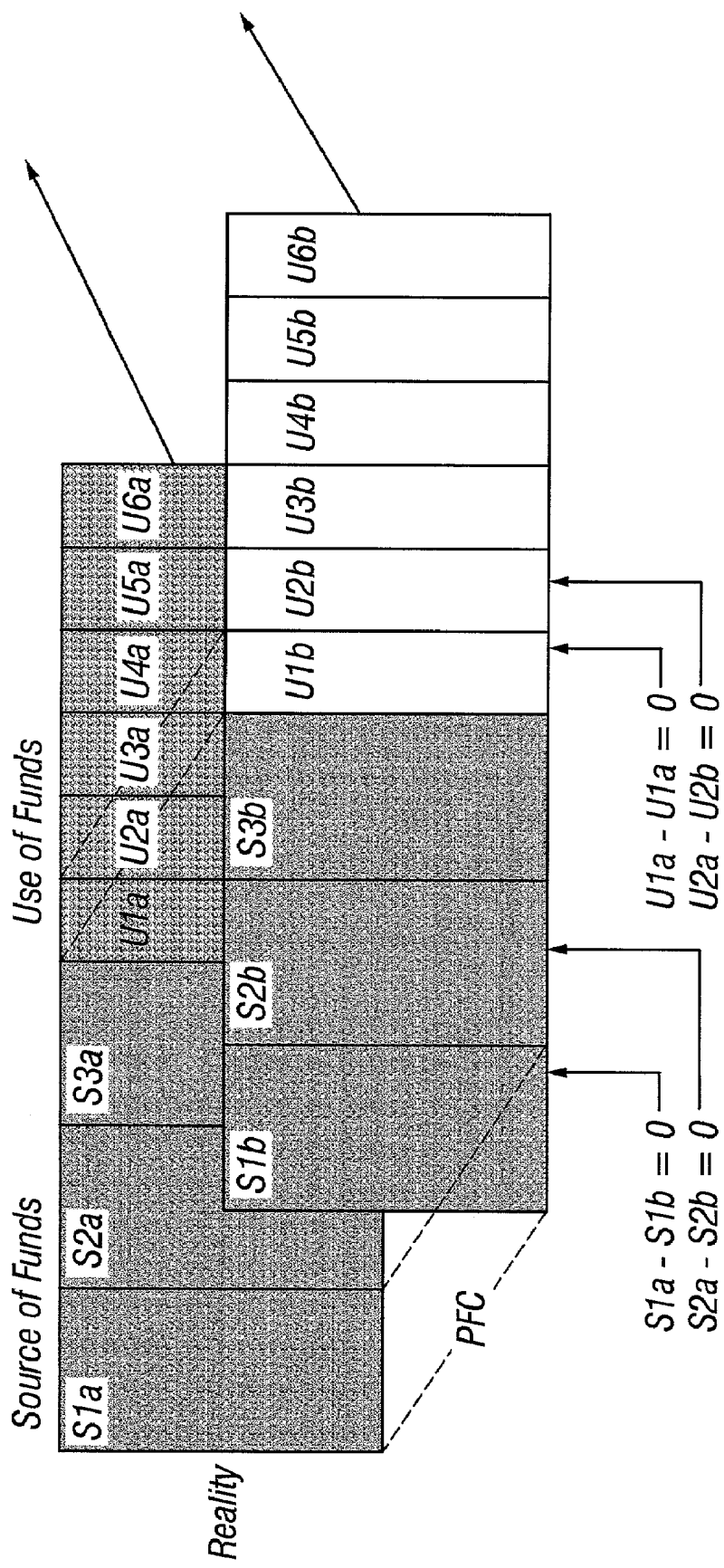
FIG. 5 is a block schematic diagram depicting an exemplary embodiment of a comparison of budgetary guidelines to actual fiscal behavior, according to the invention.

FIG. 5 is a block schematic diagram depicting an exemplary embodiment of a comparison of budgetary guidelines to actual fiscal behavior, according to the invention. In this diagram, an actual fiscal performance for a period is compared with the budgetary guidelines of the personal financial code.

Each of the anticipated sources of income and expenses matches the budgeted quantities and constraints. As such, fiscal behavior and/or habits matches those required by the personal financial code. The state of personal finance may be considered good.

Figure 6:
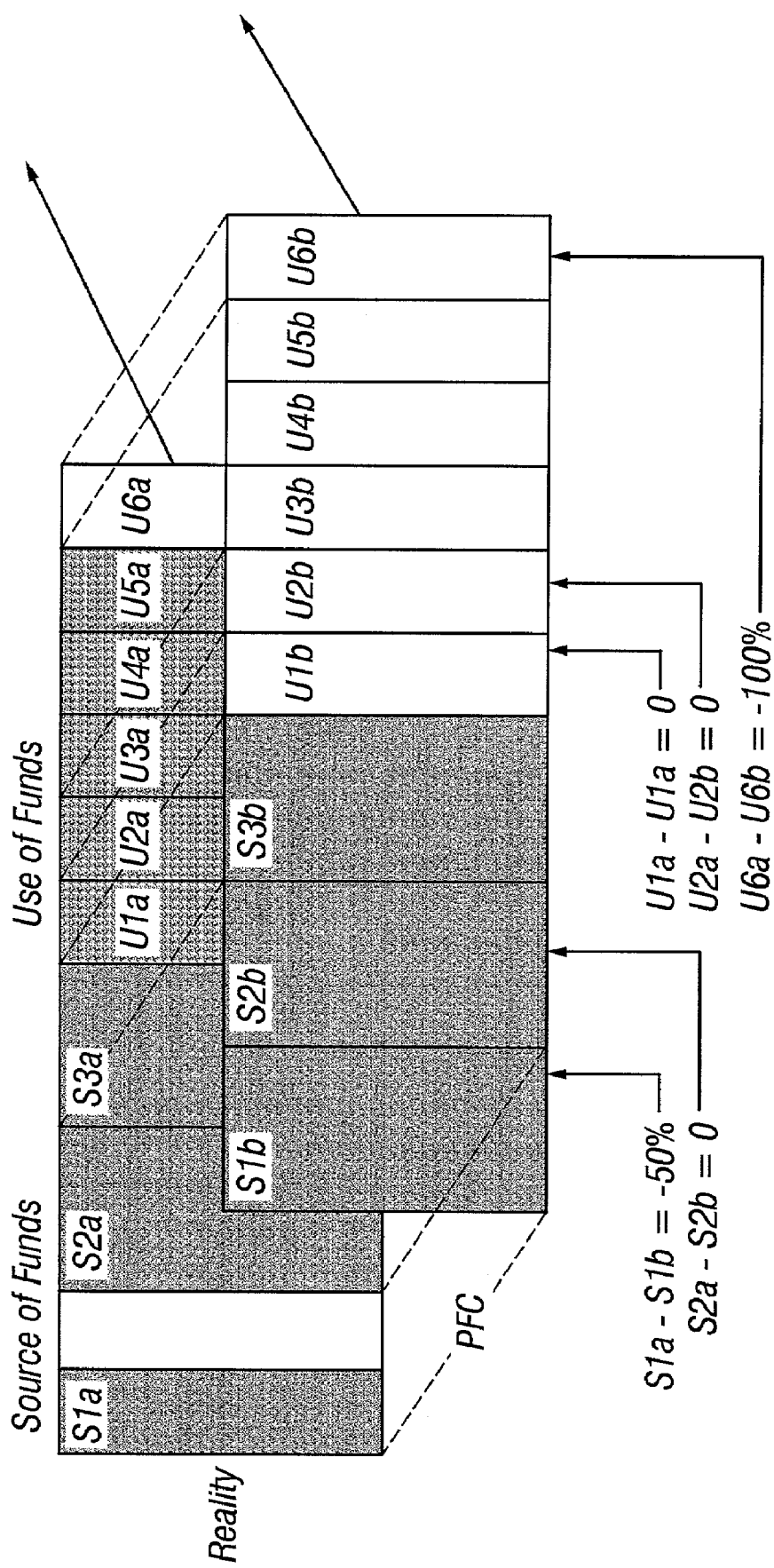
FIG. 6 is another block schematic diagram depicting a further exemplary embodiment of a comparison of budgetary guidelines to actual fiscal behavior, according to the invention.

Alternately, the fiscal behavior may not match with the budgetary guidelines. FIG. 6 is another block schematic diagram depicting a further exemplary embodiment of a comparison of budgetary guidelines to actual fiscal behavior, according to the invention. In this depiction, an income source (S1*a*) did not match the budgetary guideline (S1*b*).

The reduction in income may have been an under performing stock dividend, loss of work or wages, or another reduction in income. Alternately, an unanticipated expense may have occurred (U6a). For example, a car may have been repaired or the person may have bought something that does not exist in the budget.

However, income may exceed, meet, or miss expectations. Similarly, expenses and uses may exceed, meet, or miss expectations. These expectations may be represented by the budgetary guidelines and/or plan.

Each of these disparities between the budgetary guidelines and the fiscal behavior may have projected consequences. For example, lost income without a similar reduction in expenses may lead to a reduction in assets and an inability to meet a future fiscal event. These disparities may lead to disparities between the financial state of the individual and that represented in the personal financial code.

Figure 7:
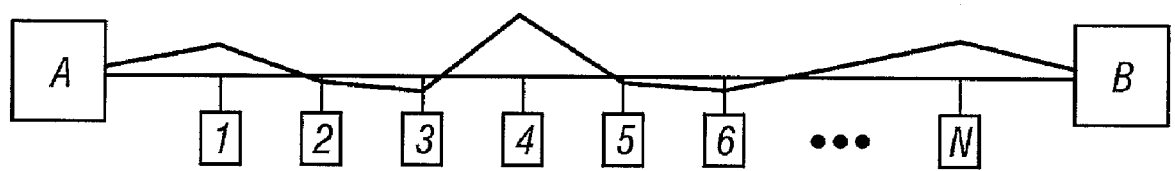
FIG. 7 is a time line representation depicting an exemplary embodiment of periodic assessment and redirection of fiscal behavior, according to the invention.

Periodic evaluation of the individual's financial state may aid in determining corrective action. FIG. 7 is a time line representation depicting an exemplary embodiment of periodic assessment and redirection of fiscal behavior, according to the invention.

As shown, in each period, the individual compares the state of personal finance at the end of the period to determine the disparity between the state and the plan or budget. The horizontal line represents equivalence of the state with the budgetary guidelines or plan. The other line shows actual performance.

With periodic evaluation, the individual may take corrective action and/or observe the effect of financial behavior relative to the financial code. With periodic reallocations of assets or changes in fiscal habits and behaviors, the individual may, for example, meet a future fiscal event. As the individual moves through time toward a goal, periodic corrections may enable the goal to be realized.

FIG. 8 is a tabular graphic depicting an exemplary embodiment of a periodic assessment and reallocation of assets, according to FIG. 7. In this exemplary embodiment, the personal financial code may be characterized by a desired asset allocation. In this case, the desired asset allocation is 80% IPA. As shown, periodic evaluation and reallocation may adjust the actual fiscal behavior to meet the personal financial code.

Further, periodic evaluation and reallocation may compensate for unanticipated events and changes in fiscal behavior. For example, the individual represented in the figure may have purchased a house after the first period. The mortgage on the house may make that house an ICA & L. As such, the asset allocation shifted from 83.3% IPA to 65.44% IPA. This shift conflicts with the personal financial code of 80% IPA. Subsequent reevaluations and reallocations increased the IPA. However, full corrective action may not have occurred until the house was sold as shown be the change from 68.81% IPA to 97.4% IPA between Dec. 13, 1997 and Dec. 31, 1998. In this case, the IPA was then excessive. For example, an ICA may also represent an item associated with lifestyle. Again, corrective action may be taken.

In this manner, the periodic reevaluation allows reallocation to meet the goals. Further, the projection of the consequences of the action may be used to make better decisions. For example, if the individual projected the consequences of the house purchase on the valuation of the IPAs, the person may not have made the purchase. Moreover, the individual may be able to see how each financial decision affects his/her overall state of financial well-being before the decision is made.

One method used for planning is to project future performance based on past performance. In this manner, the present state and anticipations about the future are derived from the past. However, an alternative may be to set the future and determine the present state based on present fiscal behavior relative to a path toward the preset future. As such, FIG. 9 is a graphic depicting exemplary methods for budgeting, according to the invention.

Figure 9:
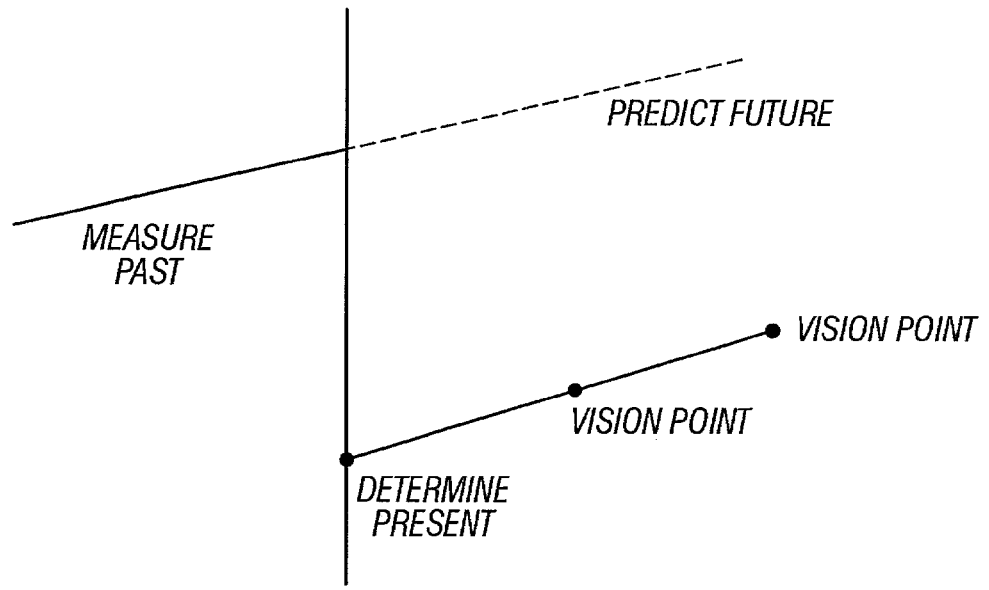
FIG. 9 is a graphic depicting exemplary methods for budgeting, according to the invention.

In FIG. 9, the business method is shown in which the measured path is projected as a broken line to the future. However, the personal financial code method is shown as a set of future fiscal events, vision points, preset states, and/or asset allocations. These states, events, vision points and allocations may then be used to determine the fiscal state at present. For example, a desired quantity for a child's college education may be represented as a future event or vision point. To reach the education goal, a present state of finance may be necessary. This may, for example, be represented as a value of a brokerage account and/or a monthly deposit and purchase of assets to be allocated for the college education. The personal state of finance may then be measured. For example, the differences in the fiscal behavior in a subsequent period may prevent the achievement of the goal.

The personal finance code sets budgetary guidelines, which allow the individual to meet future goals. Further, future deviations from the budgetary guidelines or restrictions may project negatively against the personal finance code. In addition, budgetary guidelines imposed by one aspect of a personal finance code may affect the budget allocation to other uses or requirements for other sources of income.

As such, many equations may be required to express the relationship of multiple uses, sources, allocations, future events, budgetary guidelines and other aspects of the personal finance code and fiscal behavior. The method may be implemented in software and/or through computational circuitry.

Figure 10:
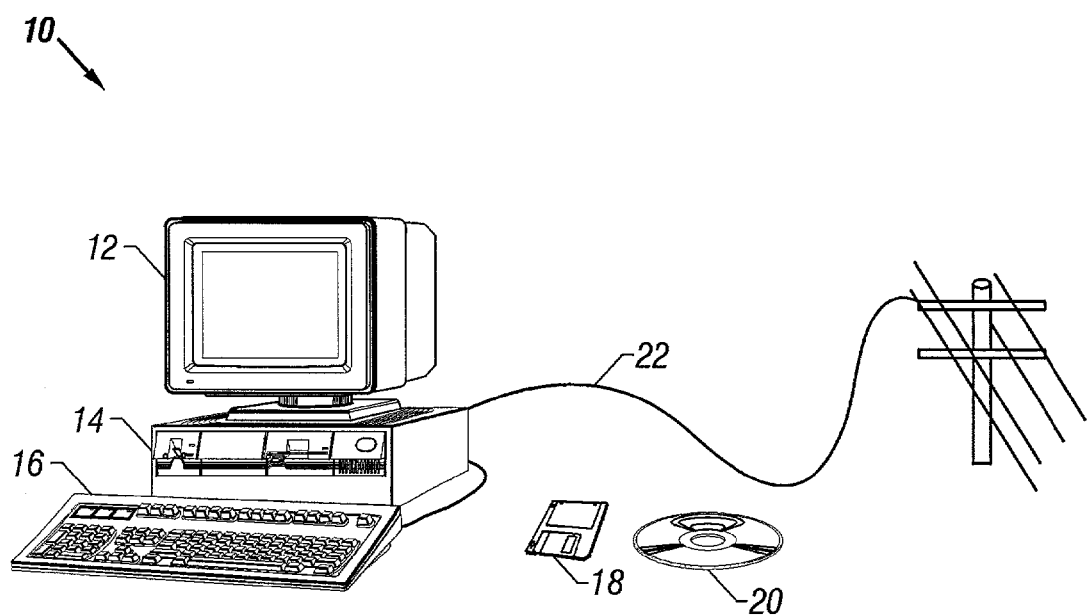
FIG. 10 is a schematic block diagram depicting an exemplary embodiment of a system for implementing the invention.

FIG. 10 is a schematic block diagram depicting an exemplary embodiment of a system for implementing the invention. The system 10 shown may be a computational circuitry. This circuitry may take many forms. These forms may include a desktop computer 14, as shown. However, the computational circuitry may also take the form of a server, a remote computer, a laptop, a smart device, a smart card, a handheld device, a PDA, and other circuitry.

Further, the circuitry may or may not be connected to a network 22. The network may be hardwired, or wireless. Further, the system may be a medium 18 20 readable by the computational circuitry. This medium may have software or a program which incorporates the method. This medium may, for example, take the form of a floppy disk, CD-ROM, DVD-ROM, CD-R, CD-RW, DVD-R, DVD-RW, flash memory, RAM, ROM, hardrive, or other mediums.

Figure 11:
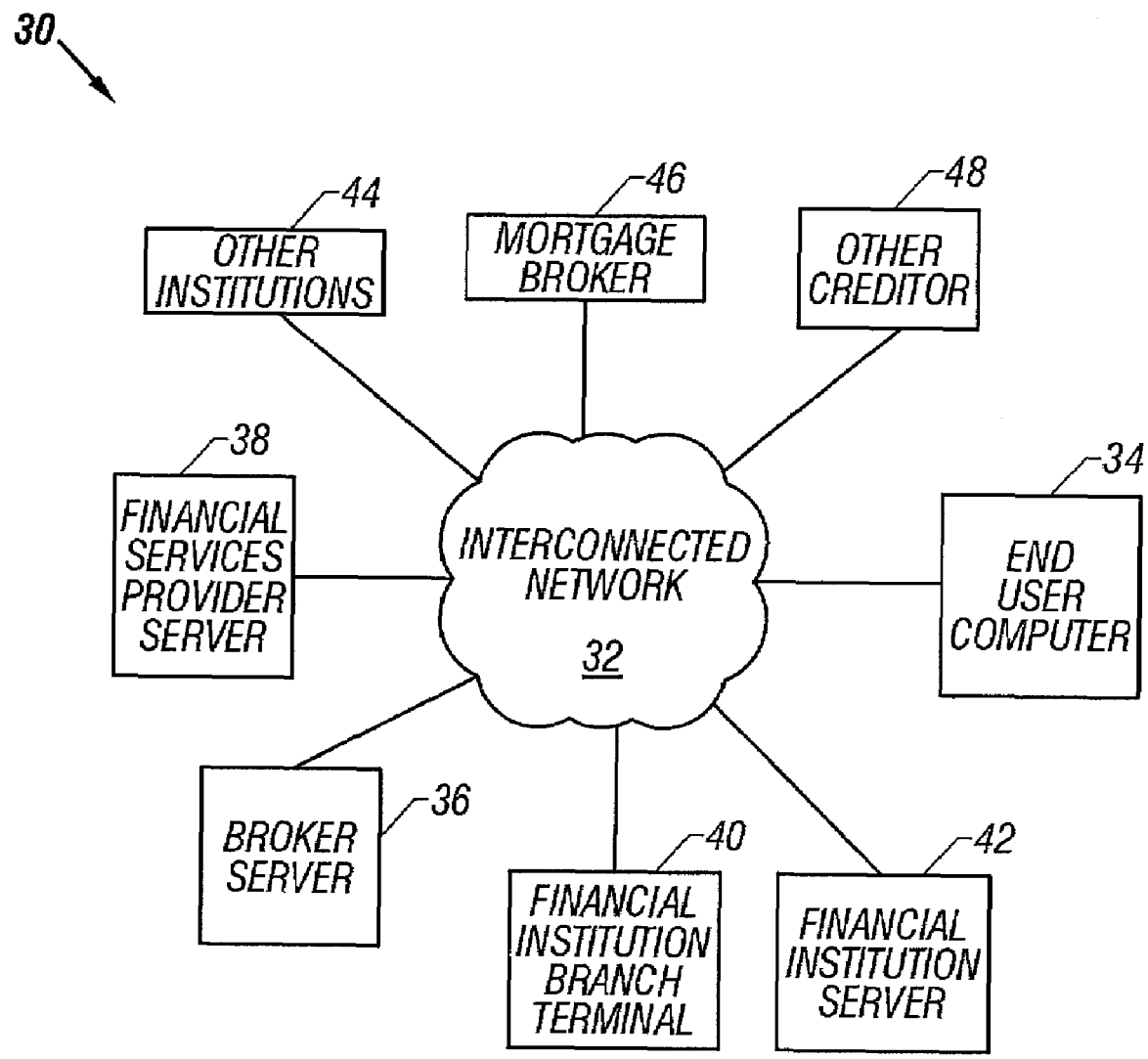
FIG. 11 is a schematic block diagram depicting a further exemplary embodiment of a system for implementing the invention.

FIG. 11 is a schematic block diagram depicting a further exemplary embodiment of a system for implementing the invention. In this exemplary embodiment, the computational circuitry may be connected to an interconnected network 32. The computational circuitry may take the form of a server 36 or an end user computer 34, for example.

In the case of the server 36, the end user computer 34 may act as a user interface. As such, the user may access the server 36 from the end user computer 34. The access may take the form of a slave-master software relationship, a web-browser, or other interface methods. For example, the user may log-in to the server 36 through an interconnected network 32 with a web browser. The server 36 may then interact with the user to gather, collect, determine and display, among others, information associated with the personal finance code, fiscal behaviors, institutional information, and others.

In the case of the computational circuitry being the end user computer 34, the end user may interact with the computation circuitry and/or software associated with the computational circuitry to gather, collect, determine and display, among others, information associated with the personal finance code, fiscal behaviors, institutional information, and others.

However, other options may exist wherein the computational circuitry is a handheld circuitry, smart phone, smart card and reader, or other device connected to the network. In addition, the system may be configured to include one or more of these devices.

In all cases, the system may operate to gather, retrieve, provide, and aggregate information associated with fiscal behavior, asset allocation and evaluation, the personal finance code, and others. This information may be used in performing an evaluation of the personal state of finance and projecting the consequence of fiscal behaviors. The information may be acquired from various institutions, banks, trusts, savings and loan, businesses, companies, organizations, and creditors, among others. These entities may, for example, be servers 42 and/or branch terminals 40 of financial institutions, banks, savings and loans, mortgage brokers, creditors, financial service providers or other institutions, among others. The information may be transferred, downloaded, retrieved, requested, exchanged, or sent through an interconnected network.

For example, an end user may download a transaction statement from a bank and/or a balance statement from a broker. These statements may, for example, be used to asses fiscal behavior and/or asset allocation. They may also be used to show how closely the individual is following the PFC.

Many typical computational circuitries will use a program or software comprising instructions for implementing the method. These programs and software may store information, temporarily, permanently, for other periods, or any combination of these periods. FIG. 12 is a block diagram depicting an exemplary embodiment of a data structure for use by the invention, as seen in FIGS. 10 and 11.

The data structure may, for example, store information associated with a specific transaction type, fiscal behavior category, asset category, asset type, spending category, or other. The data structure may, for example, store one or more values associated with one or more of the actual amount for the previous period, expected amount for the previous period, cumulative actual amount over more than one previous period, cumulative expected amount over more than one previous periods, a balance for the period, and/or a cumulative balance over more than one previous periods. The data structure may have all of these, some of these, or none of these. Further, the data structure may have these data in various combinations, configurations, and relationships. Alternately, some of the data may be calculated from other stored data.

Multiple data structures may be used in combination to determine the state of personal finance and/or determine the effect of fiscal behaviors relative to the personal finance code. FIG. 13 is a block diagram depicting an exemplary embodiment of a set of data structures for use by the invention, as seen in FIGS. 10 and 11. More than one data structures or more than one data set held in a data structure type may be used in the system.

For example, one data structure maybe used. Several instances of this data structure may be used to represent various income sources, assets classifications, and uses. Alternately, different data structures may be used to represent assets, income sources, and expenses. Further, differing data structures may be used to represent various types within the income sources, assets, and expenses. Moreover, any combination of data structure and data may be used.

Alternately, the data may be held in a database. This database may take various forms. These forms may include a relational database, object database, or listing. Further the database may take the form of a Microsoft Jet database, MySQL database, text file, and/or spreadsheet, among others. FIG. 14 is a block diagram depicting a further exemplary embodiment of a set of data structures for use by the invention, as seen in FIGS. 10 and 11.

As shown the database may hold bank transaction statements, balance statements from brokers, retirement plan statements and tax statements, among others. From these statements and/or data, the information associated with fiscal behavior and asset allocation, among others, may be gleaned. In this manner, the method may be calculated from these statements and representations.

Alternately, the information from the statements, information downloaded from remote sources, or information acquired from the user may be stored in a pre-categorized form. For example, the assets may be stored in tables associated with the categories IPA, ICA, L, NPIPA, and NA, among others.

Each of these data structure may be stored. For example, the data structures may be stored on a hard drive, floppy drive, CD-R, CD-RW, DVD-R, DVD-RW, removable drive, memory stick, network drive and others.

Figure 15:
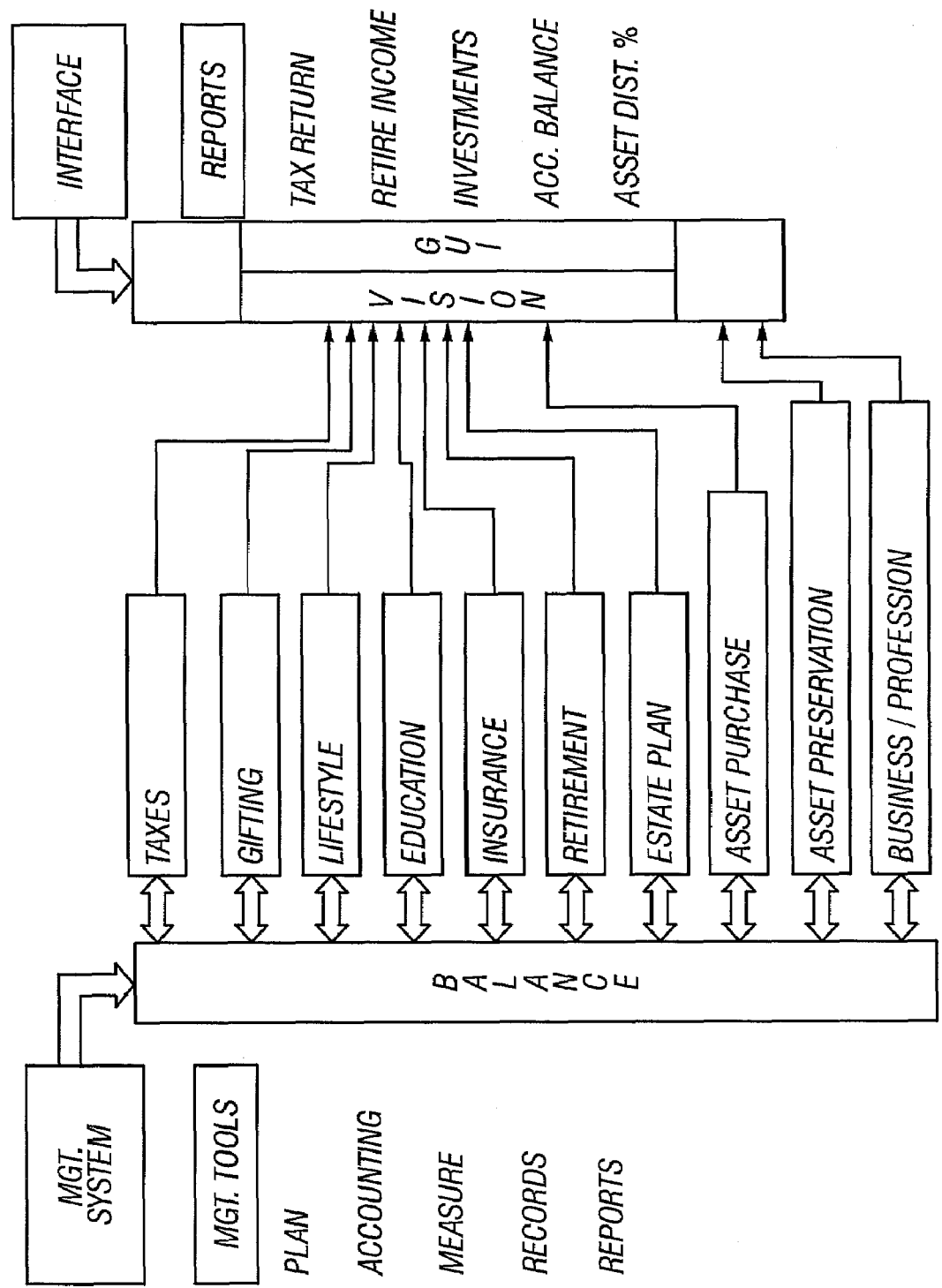
FIG. 15 is a block flow diagram depicting an exemplary embodiment of a program for use in the invention, as seen in FIGS. 10 and 11.

Once the data is acquired, stored, sorted, categorized, and/or obtained, calculations may be performed. FIG. 15 is a block flow diagram depicting an exemplary embodiment of a program for use in the invention, as seen in FIGS. 10 and 11. In this exemplary embodiment, a software module, Balance, may use the information.

Balance may use the information and further categorize or sort it. In addition, Balance may interact with the user to formulate and/or establish a personal finance code. Further, Balance may determine budgetary plans and guidelines associated with the Personal Finance Code. Furthermore, Balance may use the information acquired above to compare past fiscal behaviors with the budgetary guidelines. Additionally, Balance may compare asset allocations with Personal Finance Code asset allocation rules. Also, Balance may function to project the effect of possible fiscal decisions on the state of finance relative to the personal finance code. As such, Balance may perform the functions associated with determining a present state of personal finances.

In one exemplary embodiment, Balance may employ two models. The first model may be based on a plan or budgetary guidelines that are drawn from the PFC. The first part of PFC may be, for example, a planned source and use of funds in the first year. Another part of PFC may be, for example, a statement of assets owned in each of the four asset categories and rate of return expected on income producing assets. The second model may be a model of fiscal behavior. These models may be expressed together in a set of equations. However, the models may be expressed as separate sets of equations or in various combinations.

In a further exemplary embodiment, a projection of the models may be included in Balance. For example, Balance may project the same fiscal behavior over 25 years. In this example, Balance may also use simple interest to determine the performance of assets. As such, the result of the fiscal behavior relative to the plan or budgetary guidelines associated with the personal finance code may be compared with the personal finance code.

However, the projection of asset performance may use other models. These models may have varying complexity.

Further, the model of fiscal behavior may take others forms, be time variant, and/or be adjusted for inflation or other factors. The model of fiscal behavior may have varying complexities. Further the personal finance code may take various forms.

In addition, the data, information, and/or results of activities associated with Balance may be displayed, reported and/or provided to the user. For example, the data may be used to aid in filing tax returns. Also, the data, information, and/or results may be used to create reports associated with asset allocation, performance, distribution and valuations. Further, the data, information, and/or results may be used to create reports associated with the state of finance, projections, comparisons, comparisons of fiscal behavior and budgetary guidelines, suggested fiscal behavior and or budget changes, and others.

The software may operate in association with an operating system. For example, the operating system may be Microsoft Windows 3.0, 95, 98 0 NT, 2000, CE, ME, or XP. Further, the operating system may be UNIX-based, MacOS-based, Palm-based or other. In addition, the software may interact with an interface. The interface may be an interface associated with the operating system, a web-based interface, or other.

Figure 16:
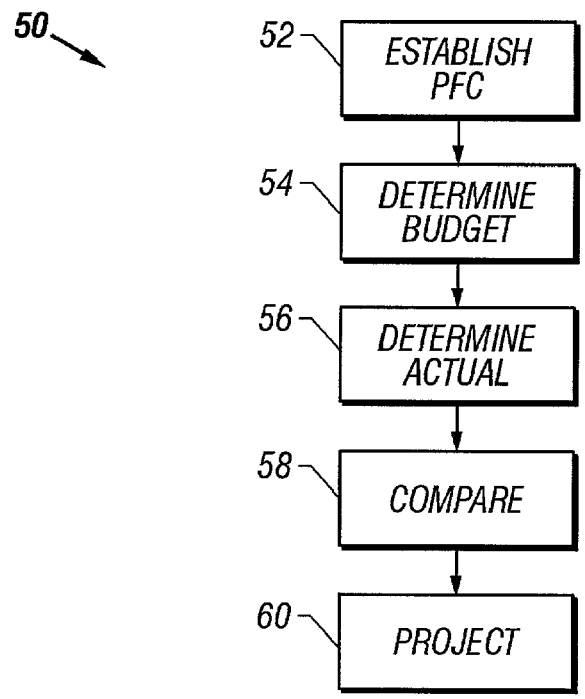
FIG. 16 is a block flow diagram of an exemplary embodiment of a method according to the invention.

Further, various methods may be implemented in the software. FIG. 16 is a block flow diagram of an exemplary embodiment of a method according to the invention. To determine a state of finance for an individual, person, and/or family, a standard and means of measuring the state relative to that standard may help. In this exemplary method 50, the standard is the personal finance code.

In a block 52, a personal finance code is established. The establishment of a personal finance code may include setting a rule regarding asset allocation, anticipating a future event for which money may be used, or determining a present lifestyle feature for which money may be used.

From the personal finance code, budgetary guidelines may be determined, as seen in a block 54. These budgetary guidelines may, for example, be monetary limits on various categories of expenditures. In one exemplary embodiment, the personal finance code may have an annual allocation of expenditures. These may be converted into monthly spending limits and/or a budgetary plan. However, this step may or may not be performed simultaneously with the step of establishing the personal finance code. Further, steps performed in establishing the personal finance code may or may not overlap with those steps of determining budgetary guidelines.

In a next block 56, the actual fiscal behavior of the individual or person is determined. The fiscal behavior may be determined from bank transaction statements, checkbook entries, asset performance, actual savings behavior, and debt payment, among others. Further, the information may be acquired electronically through an interconnected network. Forms of data mining may be used to convert information such as transaction information into the fiscal behavior. For example, expenses found on a bank statement may be categorized into spending categories. In another example, assets found on a brokerage balance statement may be categorized automatically.

Then, this actual behavior may be compared to the budgetary guidelines. In one exemplary embodiment, a categorized fiscal behavior may be subtracted from a budgetary guideline. Alternately, other methods may be used.

From this information a projection may be made as to the effect relative to the personal finance code. For example, straight-line projection may be used. The difference in the above comparison may be projected over time to indicate the effect of the actions relative to the personal financial code. This projection may for example indicate the value of assets at retirement. The amount in an educational savings account at some future date when a child may need money for college. As such, the projection may be used to understand the effect of today's actions on future expectations. For example, $10,000 a year allocated to retirement for 25 years at 8% return will yield $731,000 at retirement. If the individual expects to retire with $2,500,000, then the annual contribution planned is not in keeping with PFC. The individual must then contribute more money every year, increase the rate of return that he/she is getting, increase the number of years till retirement, or decrease the amount of money he/she will receive at retirement.

In another embodiment, the projection may be determined by comparing cumulative balances of the comparison differences for future periods. For example, if the prior fiscal behavior and budgetary guidelines remain the same, the future consequence be an excess in one category and a negative balance in another category. For example, excess spending on gifts may cause a deficit in spending on travel. As such, this may represent a deviation from the desired personal financial code. However, alternate examples may be envisaged.

The actual behavior may be determined at any point before the comparison. Further, the step of determining the actual fiscal behavior and the step of determining the budgetary guidelines may be performed in any order or simultaneously.

Figure 17:
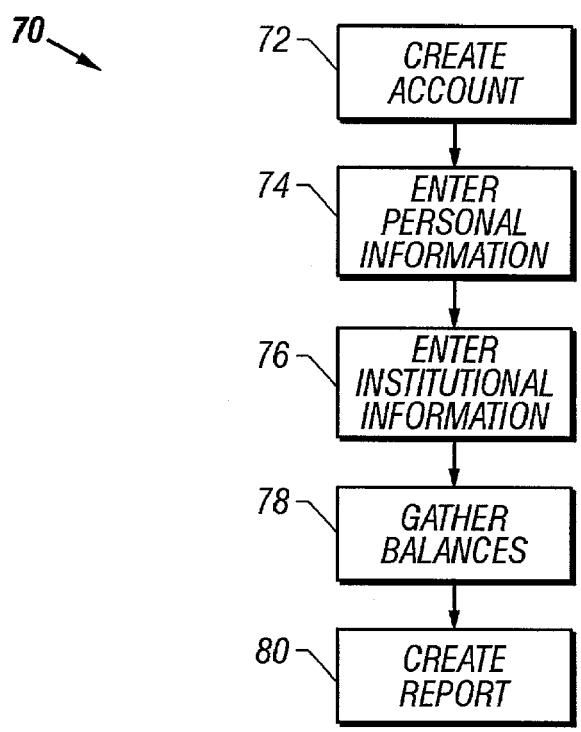
FIG. 17 is a block flow diagram of an exemplary embodiment of a method for use in the system, as seen in FIGS. 10 and 11.

FIG. 17 is a block flow diagram of an exemplary embodiment of a method for use in the system, as seen in FIGS. 10 and 11. In this method, software may be used to establish and perform the method steps of the invention. As such, a user may need to initially establish an account.

As seen in a block 72, the user may create an account. Then, the user will need to enter personal information and/or information associated with various financial entities. The personal information may include information relating to the personal financial code, identification, assets, and fiscal relationships, among others. The information associated with various financial entities may include, for example, identities of banks, account numbers, account values, and access information, among others.

Next, as seen in a block 76, the system may gather information from the financial entities and perform Balance functions. Finally, the system may create a report. This report may take various forms. These forms may include a cumulative balances report, an asset allocation report, and a goal attainment assessment report, among others.

Figure 18:
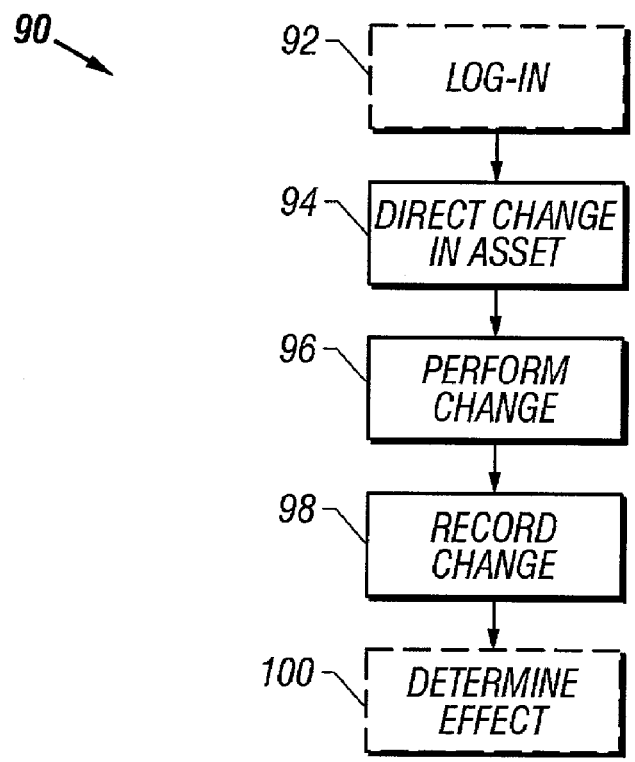
FIG. 18 is a block flow diagram of an exemplary embodiment of a method for use in the system, as seen in FIGS. 10 and 11.

FIG. 18 is a block flow diagram of an exemplary embodiment of a method for use in the system, as seen in FIGS. 10 and 11. In another exemplary method, the user may be purchasing or reallocating assets or effect some change that may alter the financial state. For example, the user may log-in to a broker and direct the purchase of stock.

In this exemplary method, the user may log-in to a financial institution's server or a software on the computational circuitry as seen in a block 92. For example, the user may access a financial institution through a web browser. However, the user may also be identified by a cookie.

The user may then direct a purchase, sell, or change in the asset, as seen in a block 94. The change may then be performed and the information regarding the change recorded by the personal financial management system. Further, the personal financial management system may project the effect of the change relative to the personal finance code.

Figure 19:
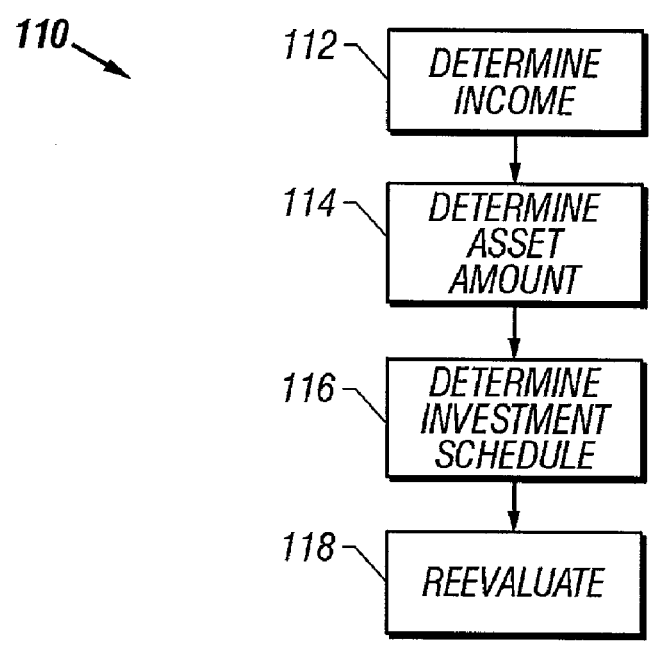
FIG. 19 is a block flow diagram of an exemplary embodiment of a method for saving, according to the invention.

An exemplary personal finance question which may be answered by the invention is "how much income will be required at retirement?" FIG. 19 is a block flow diagram of an exemplary method for saving, according to the invention. At a first time, an individual determines how they would like to live relative to their present lifestyle. For example, a person making $50,000 may desire the same lifestyle. Alternately, the individual may desire a lifestyle costing 150% of their present lifestyle.

In a next step, they project the amount of assets required to produce that same present valued income at retirement. In the example above, the individual may project the quantity of assets required to produce $50,000 per year at a given estimate rate. For example, the individual may desire $500,000 at 10%. Alternately, the individual may desire $1,000,000 at 5%. This numerical value then represents at least a part of the personal finance code.

In a further step, budgetary guidelines are determined from the personal finance code. For example, to save $500,000 in 25 years, IPA may need to be purchased annually. For example, the individual may use an annual investment schedule with fixed interest. The $500,000 in the example above would require an annual investment of approximately $5084. However, other methods may be used to determine an annual investment schedule. Further various schedules may be applied. For example, monthly schedules may be applied and ramping investment schedules may be used.

In a next step, at a subsequent time, the method may be repeated. For example, in a next year, the individual may reevaluate their investment goals. The individual may have, for example, received a raise to $55,000 and prefer to save to live at that lifestyle level. As such, the desired amount of retirement assets may be adjusted to $550,000. The annual investment amount, however, will be augmented by the assets already designated for retirement from the previous period. Further, the length of the investment schedule is shorter. Using the calculation methods above, the individual may desire to save approximately $5592 to achieve the income equivalent to the present income. One consequence of this method of adjusting the investment amount to meet a changing personal finance code is the ability to compensate inflation. The individual makes an annual adjustment to the end goal based on a desired level of lifestyle based on present valuations. The periodic adjustment compensates for inflation by repeatedly adjusting the end goal to a new lifestyle valuation. Each new adjustment takes inflation into account from the previous period. Adjusting over time automatically takes inflation into account because each new PFC uses the real inflation rate, not an estimated inflation rate. Another consequence may be, in some instances, the percentage of income allocated to retirement savings may actually diminish over time. However, other schedules and investment return calculation methods may be used.

Further this method may be abstracted to other personal finance code goals. For example, the individual may, each year, complete a new source and use allocation. Each year completing a new S&U statement changes the model and/or the personal finance code. As such, the budgetary guidelines may be adjusted.

Figure 20:
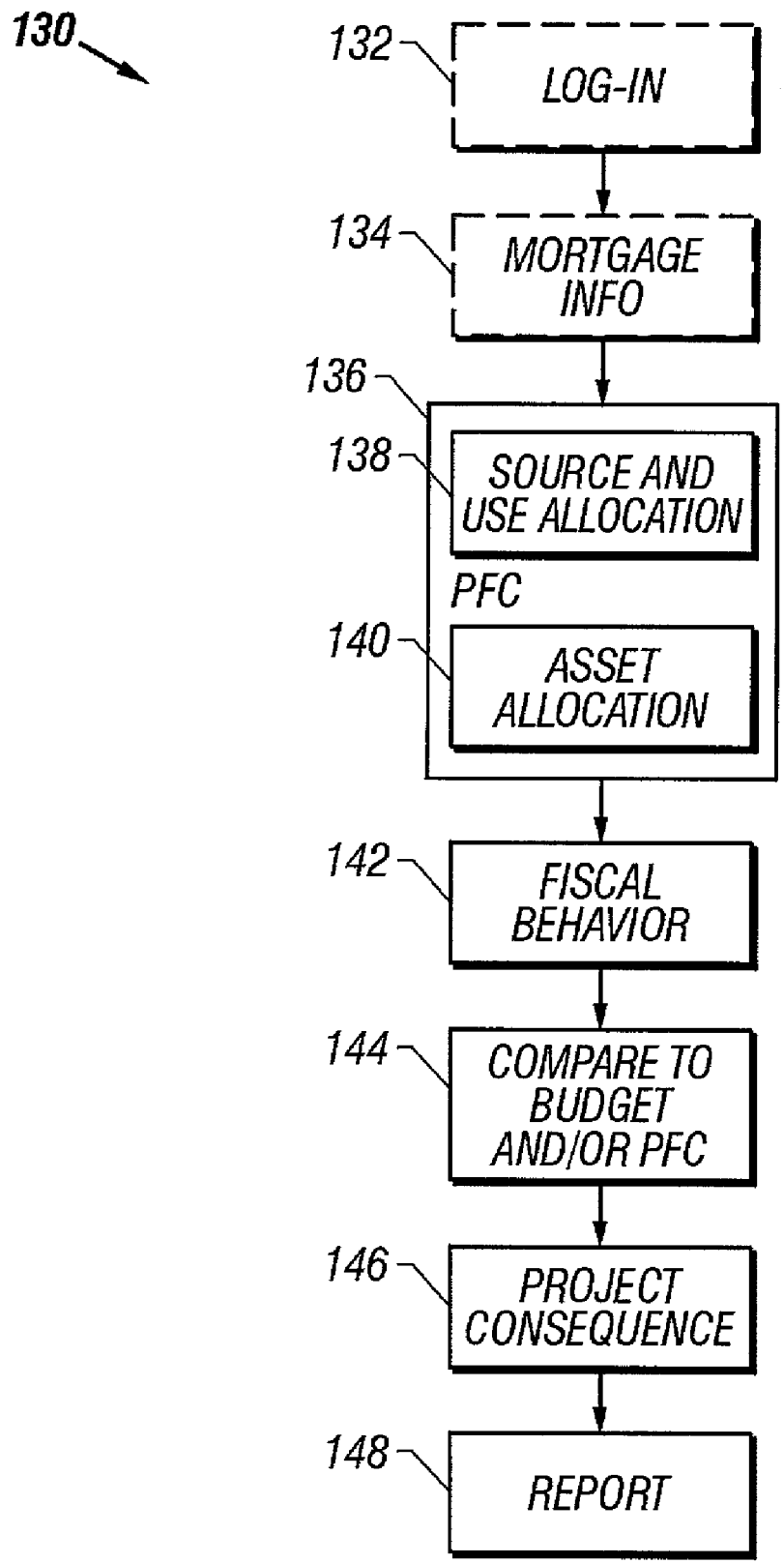
FIG. 20 is a block flow diagram of an exemplary embodiment of the system, as seen in FIG. 16.

In an exemplary embodiment of a software product according to the invention, a user may interact with a computer performing operations listed in the software. FIG. 20 is a block flow diagram depicting an exemplary embodiment of a method according to the invention.

In the method, a user may login and/or identify him/herself. However, the system may operate to automatically recognize the user and/or operate in a single user mode thereby avoiding login.

In a next step, the user may be prompted for mortgage information. However, this step may only be performed on a first execution of the method. Further, it may or may not be included in the method steps. The mortgage information may be used to determine budgetary guidelines, fiscal behavior, and asset change, among others.

In a further step, the user may enter a source and use of funds allocation. An exemplary entry table is depicted in FIG. 21. As seen in FIG. 21, the source and use of funds may for example be allocated on an annual basis. However, the allocation may be made across other period. The source of funds may include salary, new debt, retirement contributions, asset sales, investment appreciation, and others. These others may be entered, for example, in the Source cells. There may be one, more than one, or no cells depicting each of the categories above. Further, cells may be included for salaries from more than one job and/or more than one spouse. Multiple source cells may be included. For example, insurance settlements, pension income and social security may be placed in a set of source cells. Multiple cells of new debt may be used. These cells may include borrowing from credit cards, consumer loans, and others. More than one cell of retirement contributions may be included. These may include contributions to 401K, employer contributions, IRA contributions, and others. Further multiple cells may be included for the sale of assets. These cells may include the sale of various categories of assets including IPA, NPIPA, NA, ICA, and others. Further, cells may be included for the appreciation of assets.

In addition, one or more cells may be include that sum the sources. Further, a cash cell may be included that subtracts the sum of the sources from the sum of the uses.

An entry table may also be used for the use of funds. This entry table may include a plurality of cells for various use of funds categories. In addition, the table may include cells for taxes, retirement asset purchasing, mortgage interest, debt repayment, and other asset purchasing. Some, all, or none of the items may have allocated cells. Further, these items may have one or more cells allocated to various subcategories of these items. Further, the user may, for example, enter an annual allocation and the system may calculate a monthly budgetary guideline. However, the user may make allocations over various time periods.

The uses may include lifestyle expenses, rent, insurance, and other categories. These use categories may have a plurality of cells allocated to them. A user may enter an annual allocation, for example, into the annual cell. The system may calculate a monthly budgetary guideline. However, the user may make allocations over various time periods.

Cells may be allocated to taxes. These taxes may include federal, state, local, and FICA taxes, among others. Further, cells may be allocated to retirement investments. These retirement investments may include the purchase of assets. In one exemplary embodiment, these cells will equal in value, corresponding cells in the source of funds table. Cells may also be allocated to mortgage interest, debt reduction, and various categories of asset purchasing.

Further, the use of funds cells may be summed and subtracted from the source of funds to determine a cash balance. In general, the cash balance should be zero as all funds should be allocated.

Turning again to FIG. 20, the user may enter an asset allocation. The asset allocation may allocate assets across asset categories. Further, the asset allocation may establish an anticipated rate of return for the period. The asset allocation and the source and use of funds allocation may be part of a personal finance code. As seen in FIG. 22, a listing of assets in a table may be used. This listing may give a present value. Further, an anticipated rate of return may be entered. In addition, a row may be provided that totals the assets and determines an overall rate of return. Moreover, more than one table may be provided. These tables may list separate categories of assets. Separate tables may be used for each asset type, each individual, or a combination, among others.

Returning to FIG. 20, both of the source and use allocation and the asset allocation may be performed for a shortened period and projected over a full period or extended period. For example, the source and use allocation may be performed in terms of a first year allocation. This first year allocation may then be projected over an expected lifetime or some fiscal horizon, among others. The projection may be, for example, a straight project. Alternately, other projection methods may be used. For example, a method which incorporates a projected growth rate and/or inflation rate may be used.

In addition, the projection may be made in terms of a set of shortened periods. For example, a projection may be made for each year in a set of years. However, other periods may be used. Further, the periods may or may not be uniform.

In a next step 142, the actual fiscal behavior is determined. This step may be performed through entry of checkbook transactions and other financial transactions. This step may be automated. Transaction statements may be downloaded from various financial institutions.

In a next step 144, the fiscal behavior may be compared with the budgetary guidelines acquired from the source and use of finds allocation and the asset allocation. This comparison may be characterize by a difference in the budgetary guideline and the actual behavior. FIG. 23 depicts a table in which the difference may be determined, for example. In this exemplary table, the constraint and actual fiscal behavior are listed for a period. This period may, for example, be a month in a year or a year in a set of years. However, the period may take various forms. Further, a row may be allocated for cumulative constraints and cumulative actual behavior. These may be summed over the previous periods. Further, the difference may be taken between the cumulative constraints and cumulative actual behavior.

A set of these tables may be used for various spending, source and savings categories. A deficit in one category may result in an excess in another category. For example, an excess automobile expense may result in an increase in a new debt source. In another example, an under spending in a food allocation may yield increases in savings. As such, the sources, uses, and asset purchases are linked. Further, the balances display the consequence of the fiscal behavior in an easy to recognize form.

The table may extend over several periods. For example, the table may extend for several months over a year. Deficits in one month may be compensated for by excesses in another month. The year end accumulations may reflect the sum of the behaviors. Further, the table may, for example, extend over several years and show a projection of a cumulative total for future years.

Returning to FIG. 20, the comparison may be used to project a consequence of fiscal behavior on the personal finance code. For example, the deficits and excesses in various balances may be used to project the consequence of actions on future fiscal goals. For example, a reduction in savings relative to the budgetary guideline may be projected to yield a reduction in retirement income.

In another step, the balances and other calculations and projections may be printed in report forms. These forms may include a retirement projection. Balances of the fiscal behavior relative to the constraint during the present period and for future periods may be placed in a report. Further, asset allocations may be reported for the past, present, and projected future.

As stated above, business has a profit measure but the individual does not. However, the development of a personal financial management system described above produces several measures, among which may be:

Balance measure—a balance statement may, for example, record differences in each source and use category in the two models on a cumulative monthly basis. To be on track, a financial category should have a zero balance;

Asset percent measure—PFC may establish acceptable relationship between the asset types. The asset percent statement may record the planned changes in these assets. Again, differences between the two models may record variance from the plan. Assets that are on track will have a zero balance between the actual and expected or budgeted; and Retirement income measure—a personal finance code may, for example, establish the desired annual income needed at retirement. The retirement statement may show the difference between the two models as monthly financial transactions are recorded.

Moreover, the present invention may be applied to business. Further, the inventive system and method may be applied to business financial management such as sole proprietary, partnerships, non-profit organizations, and corporations, among others.

As such, a personal financial management system and method is described. In view of the above detailed description of the present invention and associated drawings, other modifications and variations will now become apparent to those skilled in the art. It should also be apparent that such other modifications and variations may be effected without departing from the spirit and scope of the present invention as set forth in the claims which follow.

What is claimed is:

1. A method for determining a state of personal finances, the method comprising:
    establishing a personal finance code, said personal finance code comprising a rule associated with the relative valuation of a set of asset categories, said set of asset categories including income producing assets, income consuming assets, non-producing income producing assets, and neutral assets;
    determining a set of budgetary guidelines associated with said personal finance code, said set of budgetary guidelines associated with at least one time period;
    deriving a comparison between said set of budgetary guidelines and a set of fiscal behaviors, said set of fiscal behaviors associated with said at least one time period;
    projecting said comparison over at least one subsequent time period to determine a projected effect, said projected effect including a projected relative valuation of said set of asset categories; and
    comparing said projected effect to said personal finance code thereby determining a state of personal finance.

2. The method of claim 1 wherein said set of fiscal behaviors comprises reallocating assets into said set of asset categories.

3. The method of claim 1 wherein said personal finance code comprises a fixture fiscal event associated with a time and a specific valuation of an asset category of said set of asset categories.

4. The method of claim 1 wherein said comparison comprises a set of differences between said set of budgetary guidelines and said set of fiscal behaviors.

5. The method of claim 4 wherein the step of projecting comprises multiplying said set of differences by a number of subsequent time periods.

6. The method of claim 1 wherein said set of budgetary guidelines are categorized into a set of categories selected from a group consisting of income, lifestyle, taxes, gifts, vacations, interest, food, clothing, insurance, automobile, home, utilities, recreation, children, spending, asset purchase, and other.

7. The method of claim 1 wherein the method is implemented in a program of instructions executable by computation circuitry.

8. A computational device, the computational device comprising:
- means for accessing data associated with a set of budgetary guidelines associated with a personal financial code, said set of budgetary guidelines associated with at least one time period;
- means for accessing data associated with a set of fiscal behaviors;
- means for deriving a comparison between said set of budgetary guidelines and said set of fiscal behaviors, said set of fiscal behaviors associated with said at least one time period;
- means for projecting said comparison over at least one subsequent time period to determine a projected effect, said projected effect including a projected relative valuation of a set of asset categories, the set of asset categories including income producing assets, income consuming assets, non-producing income producing assets, and neutral assets; and
- means for comparing said projected effect to said personal finance code.

9. The computation device of claim 8 wherein the computational device is a personal digital assistant.

10. The computation device of claim 8 wherein the computational device is a personal computer.

11. The computation device of claim 8 wherein the computational device is a server.

12. The computation device of claim 8 wherein said means for accessing data associated with said set of budgetary guidelines comprises a network interface.

13. The computation device of claim 8 wherein said means for accessing data associated with said set of fiscal behaviors comprises a network interface.

14. The computation device of claim 8 wherein said comparison comprises a set of differences between said set of budgetary guidelines and said set of fiscal behaviors.

15. The computation device of claim 14 wherein said projecting comprises multiplying said set of differences by a number of subsequent time periods.

16. A system for measuring a state of personal finances, the system comprising:
- a user interface;
- a computational circuitry communicatively coupled to the user interface;
- the computational circuitry operable to access information associated with a personal finance code, said personal finance code comprising a rule associated with the relative valuation of a set of asset categories, said set of asset categories including income producing assets, income consuming assets, non-producing income producing assets, and neutral assets;
- the computational circuitry operable to access information associated a fiscal behavior; and
- the computational circuitry operable to project an effect of the fiscal behavior and to compare said effect to said personal finance code, said projected effect including a projected relative valuation of said set of asset categories, wherein comparing said projected effect to said personal finance code includes comparing said projected relative valuation to said rule associated with said relative valuation of said set of asset categories.

17. The system of claim 16 wherein said user interface is local to the computational circuitry.

18. The system of claim 16 wherein said user interface is communicatively coupled to said computational circuitry through an interconnected network.

19. The system of claim 18 wherein said user interface comprises a world wide web browser.

20. The system of claim 18 wherein said computational circuitry is a server connected to an interconnected network.

21. The system of claim 16 wherein said computational circuitry is operable to access information associated with said set of fiscal behaviors from at least one remote source.

22. The system of claim 21 wherein said at least one remote source is communicatively coupled to said computational circuitry through an interconnected network.

23. The system of claim 16 wherein said computational circuitry is operable to access information associated with said personal finance code from at least one remote source.

24. The system of claim 23 wherein said at least one remote source is communicatively coupled to said computational circuitry through an interconnected network.

* * * * *

UNITED STATES PATENT AND TRADEMARK OFFICE
CERTIFICATE OF CORRECTION

PATENT NO. : 7,421,408 B2
APPLICATION NO. : 10/112825
DATED : September 2, 2008
INVENTOR(S) : Lee Ryder It is certified that error appears in the above-identified patent and that said Letters Patent is hereby corrected as shown below:

Column 6, line 38, delete "finds" and insert therefor --funds--.

Column 6, line 41, delete "finds" and insert therefor --funds--.

Column 18, line 58 claim 3, cancel the text beginning with the phrase "3. The method of claim 1" to and ending "of asset categories." in column 18, line 61, and insert the following claim:
--3. The method of claim 1 wherein said personal finance code comprises a future fiscal event associated with a time and a specific valuation of an asset category of said set of asset categories.--.

Signed and Sealed this

Sixteenth Day of December, 2008

JON W. DUDAS
*Director of the United States Patent and Trademark Office*